United States Patent [19]

Katayama

[11] 4,299,317
[45] Nov. 10, 1981

[54] SYNCHRO-MESH TYPE GEAR TRANSMISSION

[75] Inventor: Nobuaki Katayama, Toyota, Japan

[73] Assignee: Toyota Jidosha Kogyo Kabushiki Kaisha, Toyota, Japan

[21] Appl. No.: 92,217

[22] Filed: Nov. 7, 1979

[30] Foreign Application Priority Data

Nov. 15, 1978 [JP] Japan .................... 53-156042[U]

[51] Int. Cl.³ ............................................ F16D 23/06
[52] U.S. Cl. ................................................ 192/53 F
[58] Field of Search ............................ 192/53 F, 53 E

[56] References Cited

U.S. PATENT DOCUMENTS

| 2,221,899 | 11/1940 | White et al. | 192/53 F |
| 2,259,527 | 10/1941 | Manville | 192/53 F |
| 2,429,789 | 10/1947 | Bachman et al. | 192/53 F |
| 2,651,395 | 9/1953 | Syrovy et al. | 192/53 F X |
| 2,916,937 | 12/1959 | Iavelli | 192/53 F X |
| 3,631,952 | 1/1972 | Sugimoto | 192/53 F |

FOREIGN PATENT DOCUMENTS 536755 2/1975 Japan .

OTHER PUBLICATIONS

Intnl. Publication No. WO 79/01011 "Synchronizer for Transmissions", Morcheck et al., 11/29/79.

Primary Examiner—Rodney H. Bonck
Attorney, Agent, or Firm—Kenyon & Kenyon

[57] ABSTRACT

A synchro-mesh type gear transmission includes a clutch hub rigidly mounted on an output power shaft. The clutch hub is provided with axial slots in which springs are axially inserted. The springs urge at least one synchronizer ring against a conically tapered surface of a driven shaft gear which is mounted on the output power shaft so as to be rotatable. The synchronizer ring exerts frictional resistance against rotation of the driven shift gear. At least a portion of the inner wall of each guide slot is located in a spline-toothed flange portion of the clutch hub. The inner wall portion of the guide slot which is in the flange portion provides an additional guide for the spring. The spring is thereby prevented from being deformed in the direction in which the synchronizer ring rotates.

4 Claims, 10 Drawing Figures

SYNCHRO-MESH TYPE GEAR TRANSMISSION

BACKGROUND OF THE INVENTION

This invention relates to synchro-mesh type gear transmissions of the type used in motor vehicles, and more particularly, to a gear transmission provided with means for the reduction of gear backlash noise.

In engines for motor vehicles, the speed of engine rotation and the corresponding output torque vary over a large range. Gear-type power transmissions which are generally used with such engines produce annoying gear backlash noise which cannot be ignored. The gear backlash noise is not very significant when the engine is running at high speed, because during such operation the rotation speed and torque vary over a relatively small range, while air intake suction noises, and exhaust noises, are louder than when the engine is rotating at low speed. However, when the vehicle is stopped and the engine is idling, even small variations in the actual speed of rotation of the engine are relatively larger than when the engine is operating at high speed. During such low speed operation, large relative speed differentials may occur between an input gear and a counter input gear which is in direct engagement with the input gear, thereby, producing relatively loud gear backlash noise.

The magnitude of gear backlash noise is related to frictional resistance, which is affected by the viscosity of the lubrication oil. For example, as the temperature of the lublication oil increases, and the frictional resistance between transmission components decreases below a certain value, gear backlash noise is generated.

An improved synchro-mesh type gear transmission which reduces gear backlash noise has been proposed in Japanese Utility Model Publication Sho. 53-6755. The transmission described therein is provided with a clutch hub having axial slots in which springs are inserted. The sprins urge a synchronizer ring against a conically tapered surface of a shift gear, thereby exerting a frictional resistance against the movement of the shift gear. However, in this known gear transmission, no means are provided for guiding the springs, thereby allowing the springs to be disadvantageously deformed in the direction in which the synchronizer ring rotates.

It is, therefore, an object of the present invention to provide a new and improved synchro-mesh type gear transmission which eliminates the possibility of undesired spring deformation.

It is another object of the present invention to provide a new and improved synchro-mesh type gear transmission which includes spring means for exerting a frictional resistance by urging a synchronizer ring against a driven shift gear, in such a manner that gear backlash noise is eliminated while the spring means are prevented from being undesirably deformed.

SUMMARY OF THE INVENTION

The foregoing and other objects are achieved by this invention which provides a synchro-mesh type gear transmission having a clutch hub rigidly mounted on an output power shaft, the clutch hub being provided with axial guide slots in which springs are axially inserted. The springs urge a synchronizer ring against a conically tapered surface of a driven shift gear, which is mounted on the output power shaft so as to be freely rotatable. Thus, the synchronizer ring exerts a frictional resistance against the rotation of the driven shift gear. A sleeve member is provided which is in constant meshing engagement with the clutch hub and which selectively engages the desired driven shift gear. At least a portion of the inner wall of each guide slot is on a flange portion of the clutch hub.

DETAILED DESCRIPTION OF A PRIOR ART GEAR TRANSMISSION

A synchronizer mechanism of a synchro-mesh type gear transmission (i.e., a Borg-Warner type gear transmission) is well known from prior art. Thus, a detailed description concerning the construction and operation thereof will not be provided. A gear transmission disclosed in the above-mentioned Japanese Utility Model Publication No. 53-6755, in which a frictional resistance is exerted on a driven shift gear by means of a spring, will be briefly described.

Figure 9:
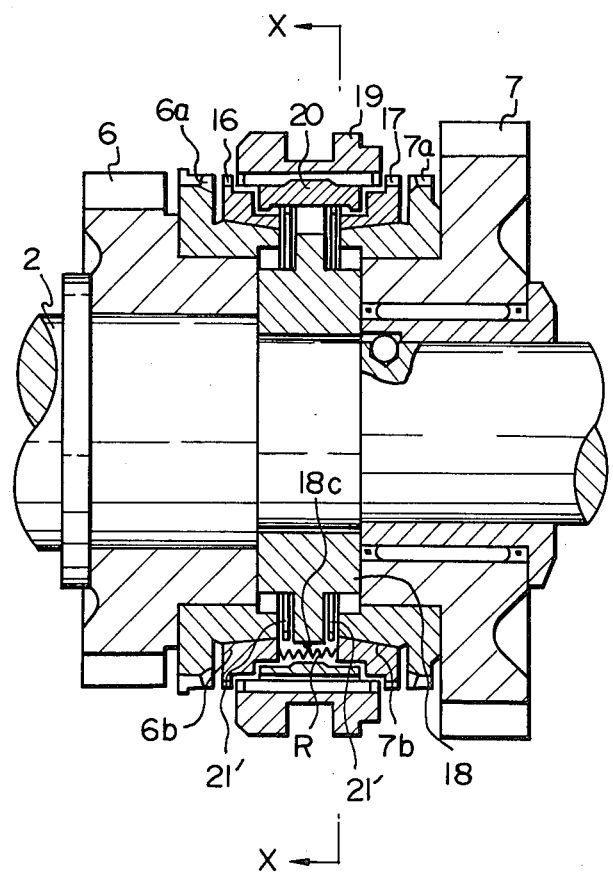
FIG. 9 is a partial cross-sectional view of a conventionally known gear transmission.
Figure 10:
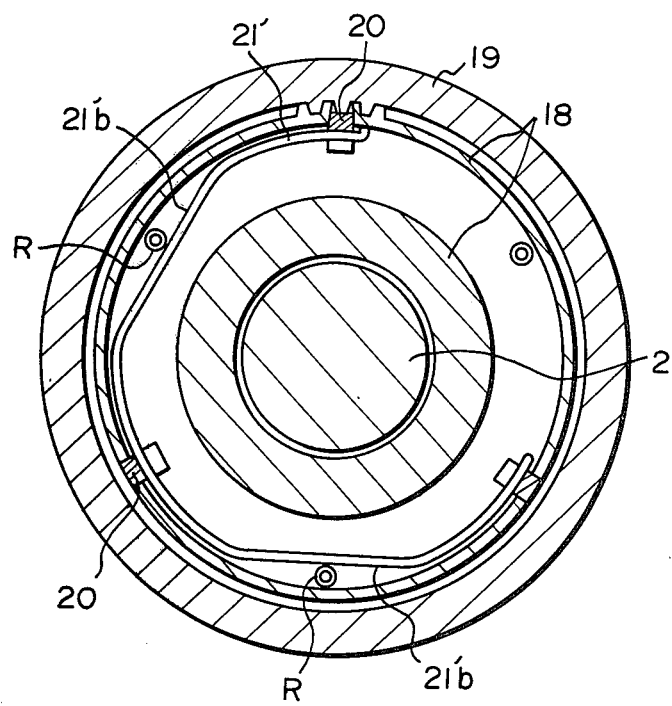
FIG. 10 is a cross-sectional view taken along line X—X in FIG. 9.

In FIGS. 9 and 10, a clutch hub 18 is provided with axially extending slots 18c which are angularly situated 120° apart and positioned corresponding to the periphery of a pair of synchronizer rings 16 and 17. Each slot 18c contains a compression spring R, the ends of which contact respective ones of synchronizer rings 16 and 17. Springs R softly urge rings 16 and 17 against conically tapered surfaces 6b and 7b of gears 6 and 7, respectively. The magnitude of the total spring expansion force of springs R which is applied against synchronizer rings 16 and 17 need be only enough to apply a small frictional resistance against gears 6 and 7. Shifting keys 20 are urged radially outward by a pluarality of key springs 21'. The spring expansion force of key springs 21' must be sufficient to urge synchronizer rings 16 and 17 against conically tapered surfaces 6b and 7b of gears 6 and 7, respectively, by means of shifting keys 20, when the synchronizer mechanism is operated. During such operation, a phase differential is present between the rotation of an inner set of spline teeth of a sleeve 19, and the rotation of the outer sets of spline teeth of synchronizer rings 16 and 17, respectively. The substantially circular key springs 21' have straight portions 21'b which are radially inwardly deformed, as illustrated in FIG. 10, so as to permit springs R to be disposed in axial slots 18c, without interference by key springs 21'.

In the neutral position, as shown in FIG. 9, if the vehicle is stopped, an output power shaft 2 is not rotated. However, an input power shaft (not shown in the drawings) is rotated through a main clutch assembly by an engine which is idling. Counter gears (not shown), which are mounted on a counter shaft (not shown) are always rotated by an input gear (not shown) which is rigidly mounted on, or integrally formed with, the input power shaft, and shift gears 6 and 7 which are in constant meshing engagement with the counter gears, are always freely rotated on output power shaft 2. The synchronizer rings 16 and 17 are softly urged against conically tapered surfaces 6b and 7b of shift gears 6 and 7, respectively, by means of springs R, so that a frictional resistance is exerted on shift gears 6 and 7. The frictional resistance is transmitted to the counter gears, which are rigidly mounted on the counter shaft and are in constant engagement with shift gears 6 and 7, and is subsequently transmitted to the input gear, thereby preventing gear backlash noise from being produced when the engine is running in an idling condition in which the relative change of speed of rotation, or turning torque, is very large.

Guide slots 18c, in which springs R are respectively inserted, are axially formed at the relatively thin flange wall portion of the clutch hub 18, so that the springs R are not fully retained or guided in the slots 18c along the entire axial length of the springs R. Therefore, when a shift lever is manually operated, and a selectable one of synchronizer rings 16 and 17 is synchronized with respect to clutch hub 18, springs R tend to deform in the direction in which the selected synchronizer ring rotates, and thus, the shift operation tends to be neither softly nor smoothly carried out.

DESCRIPTION OF THE PREFERRED EMBODIMENTS

Referring now to FIGS. 1 through 4, several embodiments of the present invention are illustrated, in which axial guide slots 18c are formed in a clutch hub 18, so that at least a portion of the inner wall 18e of each guide slot 18c is in a flange portion 18d (See FIGS. 5 and 6) of clutch hub 18. Inner wall portion 18e provides an additional guide for spring R. Springs R are thereby guided along their entire axial length, so that when a synchronizer ring is synchronized with clutch hub 18, the springs are prevented from being deformed in the direction in which synchronized synchronizer ring rotates. Accordingly, the amount of force required to be applied by springs R may be small and the shift operation can be softly and smoothly carried out when a shift lever is manually operated.

Figure 1:
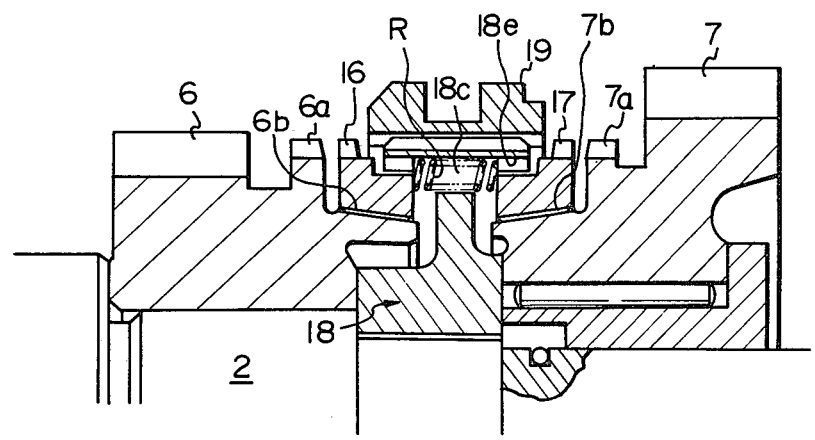
FIG. 1 is a partial cross-sectional view of an embodiment of a gear transmission of the present invention.

In the embodiment illustrated in FIG. 1, guide slots 18c extend axially through clutch hub 18. The ends of each spring R urge respective synchronizer rings 16 and 17 against corresponding, conically tapered surfaces 6a and 7b of shift gears 6 and 7.

Figure 2:
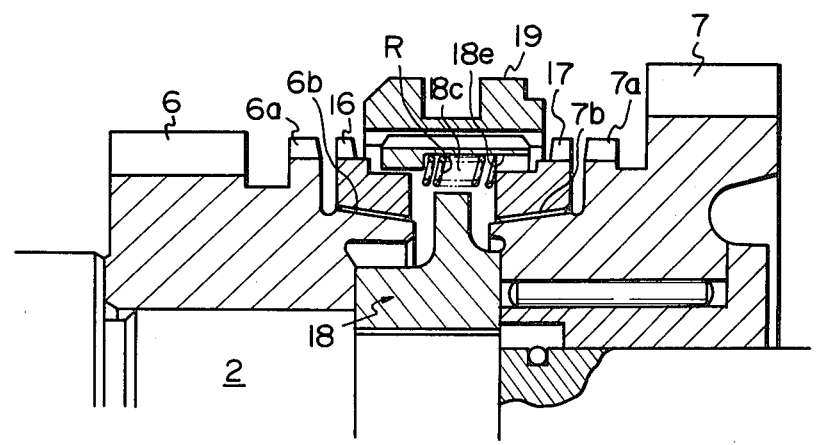
FIG. 2 is a partial cross-sectional view of another embodiment of the present invention.

In the embodiment illustrated in FIG. 2, guide slots 18c are axially formed in clutch hub 18 so that one end of each of the guide slots 18c is opened while the other end thereof is closed. Thus, springs R urge only synchronizer ring 17 against the corresponding, conically tapered surface 7b of shift gear 7.

Figure 3:
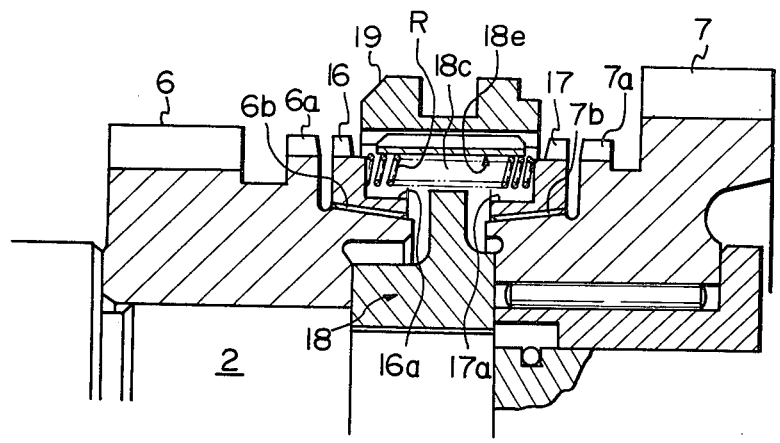
FIG. 3 is a partial cross-sectional view of a further embodiment of the present invention.
Figure 7:
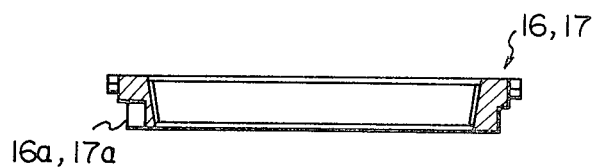
FIG. 7 is a cross-sectional view of a synchronizer ring used in a gear transmission of the present invention.
Figure 8:
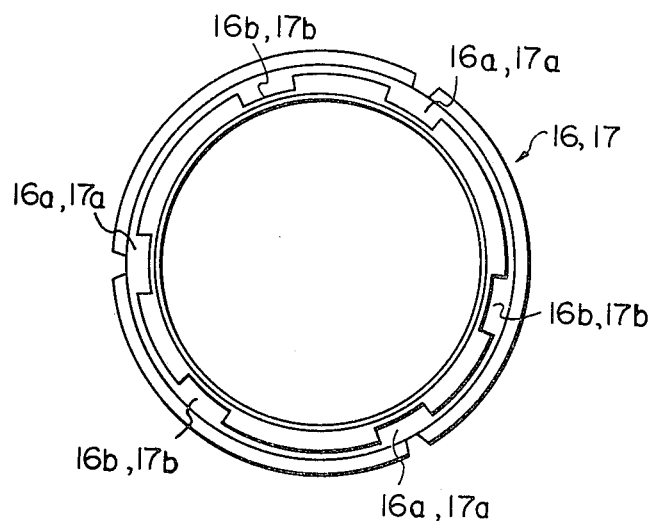
FIG. 8 is a plan view of the synchronizer ring illustrated in FIG. 7.

In the embodiment illustrated in FIG. 3, synchronizer rings 16 and 17 have guide recesses 16a and 17a, respectively, at the portions thereof where springs R extend. A synchronizer ring, such as 16 or 17, is also illustrated in FIGS. 7 and 8. Springs R are retained and guided by recesses 16a and 17a as well as by guide slots 18c. The dimensions of recesses 16a and 17a in the peripheral direction are larger than the cylindrical outer diameter of coil springs R. In view of the increased guide length which results from guide recesses 16a and 17a, relatively long springs R, which are easily designed and arranged, must be used. The other aspects of the embodiment illustrated in FIG. 3 are the same as those of the embodiment illustrated in FIG. 1.

Figure 4:
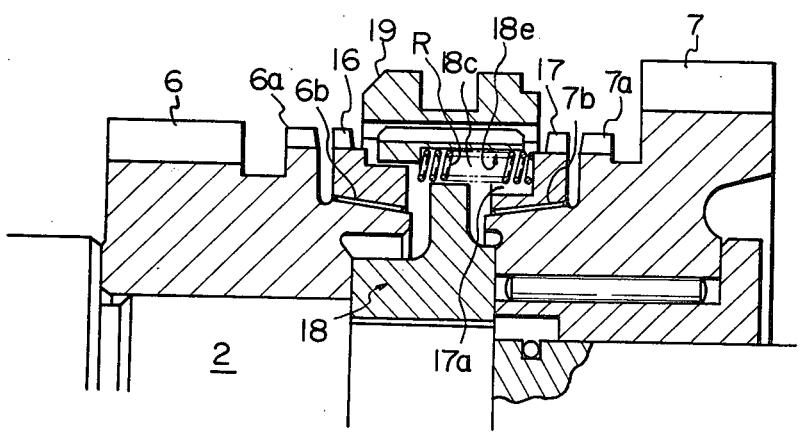
FIG. 4 is a partial cross-sectional view of still another embodiment of the present invention.

In the embodiment illustrated in FIG. 4, guide slots 18c are axially formed in clutch hub 18 so that one end of each of the guide slots 18c is opened while the other end thereof is closed, in a manner similar to that discussed above with respect to the embodiment illustrated in FIG. 2. Synchronizer ring 17 is provided with guide recesses 17a at the portions where springs R extend. This is similar to the embodiment discussed above and illustrated in FIG. 3.

Figure 5:
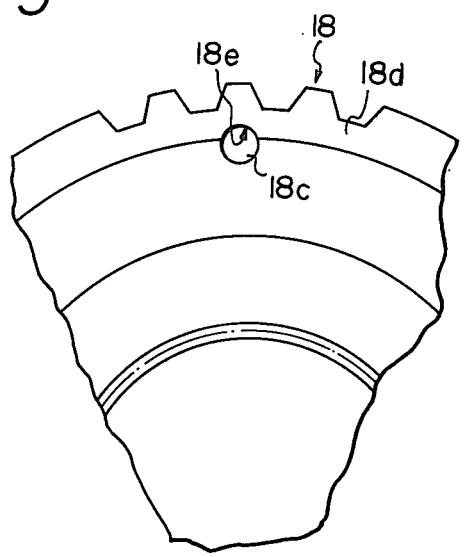
FIG. 5 is a plan view of a fragmented clutch hub used in a gear transmission of the present invention.
Figure 6:
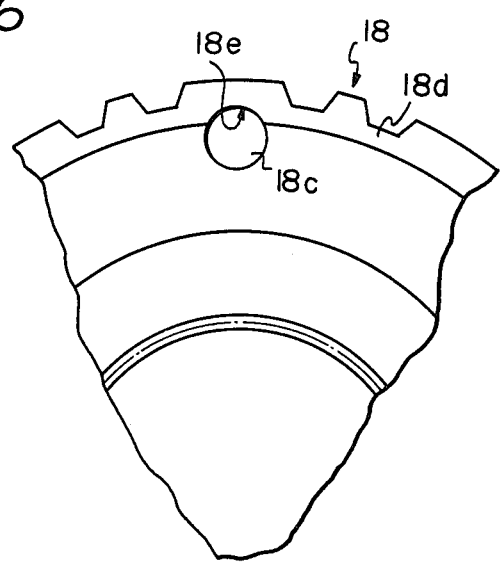
FIG. 6 is a fragmented plan view of another clutch hub used in a gear transmission of the present invention.

If the radial thickness of the externally spline-toothed flange portion 18d of clutch hub 18 is relatively small, the portions of flange portion 18d near guide slots 18c may be formed without spline teeth as shown in FIG. 6. this will permit the coil diameter of springs R to be larger than would be permissible with the clutch hub of FIG. 5.

Although the inventive concept disclosed herein has been described in terms of specific embodiments and applications, other embodiments and applications would be obvious to persons skilled in the art in light of this teaching, without departing from the scope of the invention. The description and drawings of specific embodiments are illustrative of applications of the invention and should not be construed to limit the scope thereof.

What is claimed is:

1. A synchro-mesh gear transmission of the type having a clutch hub which is rigidly mounted on an output power shaft, the clutch hub being provided with axial slots in which springs are axially inserted, the springs being arranged so as to urge a synchronizer ring against a conically tapered surface of a driven shift gear, the driven shift gear being mounted on the output power shaft so as to be rotatable with respect to the output power shaft, the synchronizer ring thereby exerting a frictional resistance against rotation of the driven shift gear, the driven shift gear being selectively coupled to the clutch hub by a sleeve member which is in constant meshing engagement with the clutch hub, the transmission being further characterized in that at least a portion of an inside wall of at least one guide slot is in a peripheral flange portion of the clutch hub so as to provide support against axially transverse deformation of the spring.

2. The transmission set forth in claim 1, wherein one end of said guide slot which has at least a portion on an inside wall in said peripheral flange portion is opened so as to permit the spring to communicate with the synchronizer ring, while the other end thereof is closed.

3. The transmission set forth in claim 1 or 2, wherein the synchronizer ring is provided with a guide recess at a predetermined portion thereof, so that the spring is supported against axially transverse deformation by the combination of said guide recess and said guide slot which has a portion of an inside wall in said peripheral flange portion of the clutch hub.

4. The transmission set forth in claim 1 wherein said peripheral flange portion of the clutch hub has an untoothed portion on its outer perimeter near said inside wall, of said guide slot, in said peripheral flange portion.

* * * * *

UNITED STATES PATENT AND TRADEMARK OFFICE
CERTIFICATE OF CORRECTION

PATENT NO. : 4,299,317

DATED : November 10, 1981

INVENTOR(S) : Nobuaki Katayama

It is certified that error appears in the above—identified patent and that said Letters Patent is hereby corrected as shown below:

In Abstract, line 6 after "driven" change "shaft" to --shift--

Col. 1, line 26 after "thereby" delete ","

Col. 1, line 38 - change "sprins" to --springs--

Col. 2, line 15 line should read: --Fig. 5 is a fragmented plan view of a clutch hub used--

Col. 3, line 42 after "length" delete ","

Col. 3, line 45 after "which" insert --the--

Col. 3, line 47 after "small" insert --,--

Col. 4, line 53 after "portion" change "on" to --of--

Signed and Sealed this

Twenty-seventh Day of April 1982

[SEAL]

Attest:

GERALD J. MOSSINGHOFF

Attesting Officer — Commissioner of Patents and Trademarks